(12) United States Patent
Tuite

(10) Patent No.: US 7,780,011 B2
(45) Date of Patent: Aug. 24, 2010

(54) MOBILE METAL RECLAMATION SOIL PROCESSING APPARATUS AND RELATED METHODS

(76) Inventor: Thomas F. Tuite, 170 McJunkin Rd., Boyers, PA (US) 16020

(*) Notice: Subject to any disclaimer, the term of this patent is extended or adjusted under 35 U.S.C. 154(b) by 380 days.

(21) Appl. No.: 11/821,851

(22) Filed: Jun. 25, 2007

(65) Prior Publication Data

US 2008/0314802 A1 Dec. 25, 2008

(51) Int. Cl.
*B03C 1/30* (2006.01)
(52) U.S. Cl. .................. 209/38; 209/630; 209/213; 209/257; 209/935
(58) Field of Classification Search ............. 405/128.1, 405/128.15, 128.7; 241/24.13, 24.14, 24.15, 241/24.25, 101.74; 209/38, 44, 630, 702, 209/703, 213, 241, 247, 257, 935
See application file for complete search history.

(56) References Cited

U.S. PATENT DOCUMENTS

| | | | |
|---|---|---|---|
| 4,874,134 A | 10/1989 | Wiens | |
| 5,071,075 A | 12/1991 | Wiens | |
| 5,184,780 A | 2/1993 | Wiens | |
| 5,234,564 A * | 8/1993 | Smith | 209/241 |
| 5,269,424 A * | 12/1993 | Lyras | 209/2 |
| 5,285,905 A * | 2/1994 | Laprade | 209/288 |
| 5,333,797 A | 8/1994 | Becker et al. | |
| 5,588,598 A | 12/1996 | Becker et al. | |
| 5,878,967 A * | 3/1999 | Conner | 241/79.1 |
| 6,136,590 A | 10/2000 | Kruse | |
| 6,311,821 B1 * | 11/2001 | Douglas | 198/311 |
| 6,860,236 B2 | 3/2005 | Wood | |
| 6,877,610 B2 * | 4/2005 | Boast | 209/405 |
| 6,974,097 B2 | 12/2005 | Simon et al. | |
| 2007/0071557 A1 * | 3/2007 | Benjamin et al. | 405/128.15 |
| 2008/0187400 A1 * | 8/2008 | Kossowan et al. | 405/128.1 |

OTHER PUBLICATIONS

Parkinson, Moore, Fouhy, "Recovering Metals From Wastes", Chemical Engineering, Apr. 1994, pp. 30-33.
Unknown Author, On-Site Recycling, Recycled Materials Company, Inc., Internet accessed May 29, 2007.
Unknown Author, "Fast Trax Mobile Processing Plants", www.kpijci.com, Internet accessed May 29, 2007.
Unknown Author, "CEW Adds Crusher to Expanding Recycling Plant", Hub Digital Media Limited, Company & Industry News, Jan. 22, 2007, Internet accessed May 29, 2007.

(Continued)

*Primary Examiner*—Richard W Ridley
*Assistant Examiner*—Jeremy Severson
(74) *Attorney, Agent, or Firm*—IP & Internet Law North, LLC; Thomas Lizzi

(57) ABSTRACT

Mobile metal scrap recovery apparatuses and methods of operating them to remove scrap metal from scrap metal-contaminated soil are disclosed. In a preferred embodiment, a mobile metal scrap recovery apparatus comprises first and second wheeled components, each of which is road transportable. The first wheeled component comprises a unit for screening the metal scrap-contaminated soil into at least a coarser fraction and a finer fraction. The second wheeled component comprises a magnet separator, an eddy current separator, and a manual picking station. Methods for conducting the business of scrap metal recovery are also disclosed. Such business methods involve the use of a mobile metal scrap recovery apparatus to remove scrap metal from scrap metal-contaminated soil.

48 Claims, 2 Drawing Sheets

OTHER PUBLICATIONS

Unknown Author, "Recycling fuels demand for mobile plant: mobile crushing and screening isn't a new concept . . . ", AllBusiness.com, Internet accessed May 29, 2007.

Unknown Author, C & D Equipment, DZ 750 Kombi Grinder & Shredder Combo, undated, Internet accessed May 29, 2007.

Unknown Author, C & D Equipment, SM 414 Profi Portable Trommel Screen, undated, Internet accessed May 29, 2007.

Unknown Author, C & D Equipment, SM 518 Profi Portable Trommel Screen, undated, Internet accessed May 29, 2007.

Unknown Author, C & D Equipment, SM 620 Profi Portable Trommel Screen, undated, Internet accessed May 29, 2007.

* cited by examiner

MOBILE METAL RECLAMATION SOIL PROCESSING APPARATUS AND RELATED METHODS

BACKGROUND OF THE INVENTION

1. Field of the Invention

The invention relates to the field of recovering scrap metal from soil. More particularly, the invention relates to mobile apparatuses which are usable for recovering scrap metal from scrap metal-contaminated soil and methods related thereto. The invention also relates to the field of business methods involving the scrap metal recovery business.

2. Background

The soil of scrap yards, recycling centers, landfills, and other areas where large quantities of scrap metal are handled becomes, over time, contaminated with bits and pieces of the scrap metal that was handled there. The amount of scrap metal that becomes mixed into the soil varies with the nature of the operation taking place near or on the soil. For example, the areas in the vicinity of automobile shredders are particularly susceptible to becoming embedded with large amounts of scrap metal. Also, the care with which the scrap metal is handled and transported across the soil impacts the amount scrap metal that gets left behind and commingled with the soil. Scrap metal-contaminated soil may also be mixed in with the scrap or refuse when it arrives by transport vehicle.

Typically, the scrap metal-contaminated soil eventually gets segregated into piles for transport to landfills for disposal. This may happen at any time during the life cycle of the scrap yard, recycling center, et cetera, (hereinafter and in the appended claims referred to individually and collectively as a "handling facility"), but most generally occurs after operations at the handling facility have been terminated and the site is being rehabilitated for another use. The transport of the scrap metal-contaminated soil entails a high transportation cost, especially if the disposal site is distant. The disposal fee is also high because of the presence of the scrap metal.

Where the economic incentive is large enough, a scrap metal recovery plant may be constructed on the site of the handling facility to remove the scrap metal contaminants from the soil. The inventor of the present invention configured and installed such a recovery plant, which became operational in 2000, at a closed handling facility in New Hampshire. The recovery plant took about a month to construct on site and cost over $800,000 to install. The recovery plant included a vibratory bed soil screener station, a magnetic separator, a vibratory feeder, an eddy current separator, a manual picking station, and several conveyor belts. The scrap metal-contaminated soil was fed into the screener station where it was screened into two substreams, a coarser one which contained the material that did not pass through the 1½ inch opening screen of the screening station and a finer one that contained the material that passed through the screen. The finer substream was fed by a conveyor belt to a magnetic separator to remove the magnet attractable scrap metal and then via a vibratory feeder into an eddy current separator to remove the separable non-magnet attractable scrap metal. Another conveyor belt then transported the finer substream to a picking station where identifiable pieces of remaining scrap metals, such as stainless steel, insulated copper, and lead, were manually removed. After processing, the cleaned, residuary soil of the finer substream was disposed of on-site.

Recovery plants employing some combination of one or more items selected from the group consisting of screeners, magnetic separators, vibratory feeders, eddy current separators, manual picking stations, and conveyor belts have been known in the art for treating non-sorted refuse material streams which do not include scrap metal-contaminated soil as a primary component. For example, U.S. Pat. No. 5,184,780 to Wiens, issued Feb. 9, 1993, discloses a fixed plant system and process for treating solid waste that includes a trommel screen, several magnetic separators, a manual picking station, an eddy current separator, conveyors, and several other pieces of equipment. In another example, U.S. Pat. No. 6,974,097 B2 to Simon et al., issued Dec. 13, 2005, discloses a method for providing an alternative cover for landfills from materials in a recycling operation which includes, inter alia, passing at least a part of the material stream through magnetic separators and a trommel screener.

In many cases, however, the economic incentive is not sufficiently high to justify the installation of a recovery plant at a handling facility for recovering scrap metal from scrap metal-contaminated soil. Even in the cases where the economic justification is sufficient, the processing costs will increase as the distance of the recovery plant from the scrap metal-contaminated soil increases as soils from more distant areas of the handling facility are processed. Also, when the last of the soil that is economically viable to process has been processed, the recovery plant must be decommissioned and then either removed and reassembled elsewhere, its components sold for reuse or scrap, or simply abandoned. In any case, a significant economic cost is incurred at the recovery plant's end stage.

What is needed is an economical method of recovering scrap metal from the scrap metal-contaminated soils of handling facilities. What is needed is a means of processing the scrap metal-contaminated soils that diminishes the costs associated with conventional recovery plants. These needs have existed for decades, but heretofore have gone unsatisfied.

Up until now, the business of scrap metal recovery from scrap metal-contaminated handling facility soils has focused on employing business plans which involve either the construction of a fixed recovery plant at the handling facility or the transportation of the scrap metal-contaminated soil to a remote fixed recovery plant for processing. Such business plans involve a high threshold level for economic viability due to the capital equipment investment costs and risks and/or transportation costs involved. What is needed is a business plan which lowers both the economic threshold for viable scrap recovery and the level of risk involved. This, too, is a long-felt need that has heretofore gone unsatisfied.

SUMMARY

The present invention satisfies the aforementioned long-felt needs and overcomes the difficulties incumbent with prior art methods, recovery plants, and associated business plans by providing mobile soil processing apparatuses that are capable of recovering scrap metals from scrap metal-contaminated handling facility soils, methods for using such mobile soil processing apparatuses, and business plans which employ such mobile soil processing apparatuses.

In one aspect of the invention, there are provided mobile soil processing apparatuses that are configured to be transported by highway from one handling facility to another. The mobile soil processing apparatuses may also be moved from one location to another within a handling facility thereby decreasing the operating costs associated with moving the scrap metal-contaminated soil to be processed and the cleaned, processed soil.

In another aspect of the invention there are provided methods for recovering scrap metal from scrap metal-contaminated soil of a handling facility through the use of mobile soil processing apparatuses.

In another aspect of the invention, there are provided business methods for conducting the business of recovering scrap from the scrap metal-contaminated soil of a handling facility by utilizing mobile soil processing apparatuses.

BRIEF DESCRIPTIONS OF THE DRAWINGS

The criticality of the features and merits of the present invention will be better understood by reference to the attached drawings. It is to be understood, however, that the drawings are designed for the purpose of illustration only and not as a definition of the limits of the present invention.

DETAILED DESCRIPTION OF PREFERRED EMBODIMENTS

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims to those particular embodiments.

Figure 1:
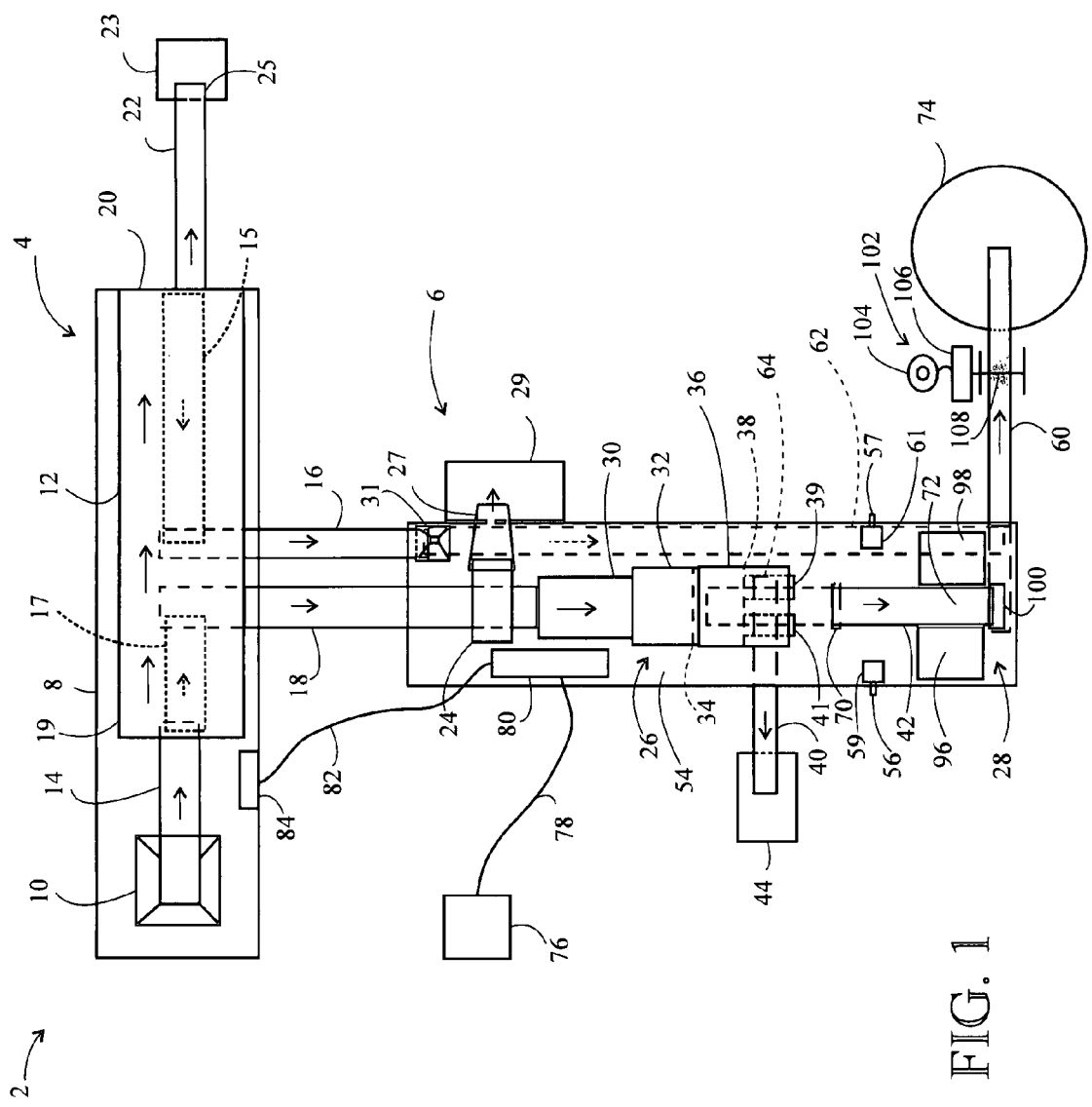
FIG. 1 is a schematic plan view of a mobile metal scrap metal recovery apparatus according to an embodiment of the present invention.

Referring to FIG. 1, there is shown a schematic plan view of a preferred embodiment of a mobile scrap metal metal recovery apparatus 2 according to the present invention. The scrap metal recovery apparatus 2 comprises two main components, a first wheeled component 4 and a second wheeled component 6. The first and second wheeled components 4, 6 act in tandem to process the scrap metal-contaminated soil. The first and second wheeled components 4, 6 are configured to be transportable across the roads from which the handling facilities at which the scrap metal recovery apparatus 2 is to be used are accessible. As used herein and in the appended claims the term "transportable" is to be construed as meaning that the wheeled component to which it refers is a vehicle which is compliant with the laws and regulations which govern vehicle travel over the particular road or set of roads over which it is expected to travel. Preferably, the first and second wheeled components 4, 6 are configured so as to be transportable over roads which are a part of the United States National Network.

Both the first and second wheeled components 4, 6 are adapted to be pulled by a truck tractor for transport and to be removed from the truck tractor and rigidly stabilized for use. However, it is to be understood that in other embodiments of the present invention one or both of the first and second wheeled components may be a self-propelled vehicle.

The first wheeled component comprises a screener which is capable of separating scrap metal-contaminated soil into at least two fractions. Where the screening is to only two fractions, it is preferred that the screening be done to a screen size that has nominal size openings in the range of between about 3 inches and about 4 inches. The screener may be any type of screener that is known to those skilled in the art. Examples of such screeners include, without limitation, vibratory bed screeners and trommel screeners. The screener may have an integral feed bin or may be fed by an external feed bin or other source of input scrap metal-contaminated soil. Note that for ease of expression, during the remainder of this section, scrap metal-contaminated soil is simply referred to as "contaminated soil."

The screener 8 shown in FIG. 1, is a trommel screener having an integral feed bin 10, a rotatable cylindrical screen 12, and a conveyor belt 14 for moving contaminated soil from the feed bin 10 to the rotatable cylindrical screen 12. It is preferred that this conveyor belt 14 be made of metal for longevity, but may be made of rubber or other suitable conveyor belt materials. The inventor has found that the metal tread of a caterpillar drive vehicle works well for this conveyor belt 14.

The screen of a trommel screener is shaped like an open-ended cylinder. The cylinder is tilted slightly from the horizontal and rotated so that contaminated soil that is fed into one end of the cylinder is agitated by the rotating motion enough to be sieved by the rotating circumferential screen while gravity assists in moving the contaminated soil along the length of the cylinder. The undersize portion of the contaminated soil falls through the circumferential screen onto one or more conveyor belts and the oversize portion of the contaminated soil exits the far end of the cylinder.

In the screener 8, the rotatable cylindrical screen 10 has three different screen sizes with nominal openings of ⅝ inches, 2 inches, and 3 inches, respectively, arranged so that the contaminated soil being screened encounters progressively larger screen sizes as it travels from the feed end 19 to the exit end 20 of the screen 12. In this embodiment of the present invention, the contaminated soil that passes through the ⅝ inch openings is collected on a conveyor belt 15, which is located underneath the rotatable cylindrical rotatable cylindrical screen 12, as the fine fraction. This conveyor belt 15 transfers the fine fraction to another conveyor belt 16, which in turn, transfers the fine fraction to the second wheeled component 6. The contaminated soil that passes through the 2 inch and 3 inch openings is collected on another conveyor belt 17, which also is located underneath the rotatable cylindrical screen 12, as a mid-range fraction. This conveyor belt 17 transfers the mid-range fraction to another conveyor belt 18, which in turn, transfers the mid-range fraction to the second wheeled component 6. Further discussion of conveyor belts 16, 18 is deferred until it becomes relevant during the description of the second wheeled component 6 to mention them again. The contaminated soil that exits the exit end 20 of the rotatable cylindrical screen 12 is collected on yet another conveyor belt 22 as the coarse fraction. Conveyor belt 22 carries the coarse fraction to a location where it may be collected, e.g., to bin 23. Due to the relatively large size of this fraction, very little actual soil is contained in this coarse fraction, even though the coarse fraction may represent a substantial weight fraction of the original contaminated soil. A magnet head drum 25 or other magnetic device may be located at the exit end of this conveyor belt 22 to segregate out magnet attractable scrap metal which may be in the coarse fraction.

The second wheeled component 6 comprises the equipment that achieves the principle portion of the scrap metal removal from the contaminated soil. Among this equipment is a cross-belt magnet 24 for removing magnet attractable scrap metal from the mid-range fraction as it travels along conveyor belt 18. The cross-belt magnet 24 discharges the magnet attractable scrap metal into chute 27 which directs it into bin 29. The scrap metal removing equipment of second wheeled component 6 also consists of an eddy current separator 26 for removing some of the non-magnet attractable scrap from the mid-range fraction, and a manual picking station 28 whereat visually identifiable pieces of scrap metal may be removed by hand from the mid-range fraction. The second wheeled component 6 also has a vibratory feed pan 30 for spreading out the contaminated soil into a wide, shallow sheet-like stream just prior to the mid-range fraction being fed onto the feed table 32 of the eddy current separator 26. Thus, the vibratory feed pan 30 helps the mid-range fraction to pass over substantially the entire width of the eddy current separator head 34 thereby increasing the separation efficiency of the eddy current separator 26.

Persons skilled in the art will understand that an eddy current separator is able to remove pieces of non-magnet attractable metals from a mixed material stream by inducing electrical currents (known as eddy currents) in such metal pieces by subjecting them to a rapidly changing magnetic field produced by a rotating horizontal magnetic roll. The induced electrical currents create a magnetic field of their own that is oppositely directed to the changing magnetic field produced by the eddy current separator. Whenever the force of repulsion produced by the interaction of these two oppositely directed magnetic fields is strong enough, it causes the metal piece to seemingly fly away from the head of the eddy current separator and into the far side of a collection box. The processed material which is not repelled by the changing magnetic field falls in a tight arc into the near side of the collection box. A positionable divider is provided to selectively bisect the collection box so that the material falling into the near side of the collection box is kept separate from that which travels into the far side of the collection box.

In the embodiment of the present invention shown in FIG. 1, the contaminated soil and separated scrap metal entering the collection box 36 are funneled down along its own side of the divider 38 and out the bottom of the collection box 36 onto one of two conveyor belts 40, 42. The first of the conveyor belts 40 carries the separated metal pieces into a bin 44. The collection of this scrap metal can be more tightly focused onto the conveyor belt 40 by attaching rectangular sheets of steel, e.g., sheets 39, 41 to one side of the divider 38 to form a funnel that travels with the divider 38 when it is repositioned. Slots may be provided in the side of the collection box 36 to allow the sheets to pass therethrough. The other conveyor belt 42 carries the remaining mid-range fraction to the manual picking station 28.

Figure 2:
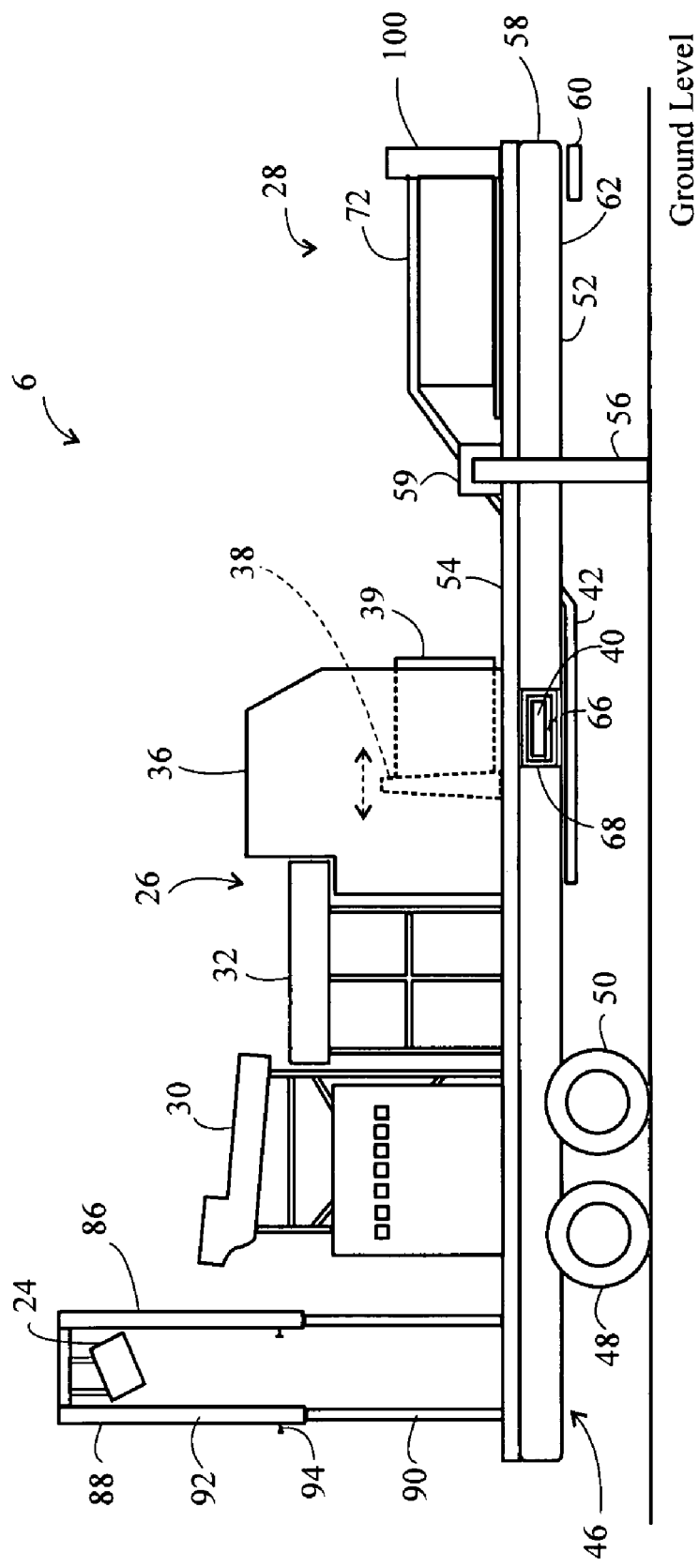
FIG. 2 is a schematic side elevation view of the second wheeled component of the embodiment shown in FIG. 1.

Referring now to FIG. 2, which shows a schematic side elevation view of the second wheeled component 6, it is seen that the second wheeled component 6 also comprises a support structure 46 which has two axle sets of wheels 48, 50, a frame 52, a bed floor 54, and a pair of removable supports 56, 57, which fit into mounts 59, 61 (see FIG. 1), for supporting the pulled end 58 of the second wheeled component 6 when it is not attached to a truck tractor. A truck trailer having one or more axle sets of wheels may be modified and used as the support structure.

Referring again to FIG. 1, the second wheeled component 6 also comprises four conveyor belts 40, 42, 60, 62. Two of these conveyor belts 40, 42 have already been mentioned. One of the already mentioned conveyor belts is the one 40 that carries away the metal pieces that have been separated by the eddy current separator 26 to the bin 44. The feed end 64 of this conveyor belt 40 is below the bed floor 54 and this conveyor belt 40 passes through an aperture 66 in a reinforced section 68 of the frame 52 (see FIG. 2). This conveyor belt 40 is detachable and is stored on a rack (not shown) on the second wheeled component 6 for transport. The other conveyor belt that has been mentioned is the one 42 that carries away the remaining mid-range fraction from the eddy current separator 26 to the manual picking station 28. Conveyor belt 42 passes under the feed end 64 of the conveyor belt 40 which carries away the separated metal pieces from the eddy current separator 26. Conveyor belt 42 then rises up through an aperture 70 in the bed floor 54 and then becomes horizontal to form the table portion 72 of the manual picking station 28. Conveyor belt 42 may remain in place during transport.

The third of the four conveyor belts of the second wheeled component 6 is another detachable conveyor belt 60, which may be transported on a rack on the second wheeled component 6 during transport. It is attachable to the frame 52 at a location where it can collect the cleaned mid-range fraction that passes off of the end of the picking station table 72. This conveyor belt 60 transports this cleaned mid-range fraction away from the second wheeled component 6 to where it may be stockpiled, e.g., as pile 74.

The last of the four conveyor belts of the second wheeled component 6 is a conveyor belt 62 which is mounted below the bed floor 54, and runs along the entire length of second wheeled component 6. This conveyor belt 62 is used to carry the fines fraction to join the cleaned mid-range fraction from the manual picking station 28 on the just-described third conveyor belt 60. The fines fraction is input onto conveyor belt 62 from the first wheeled component 4 by way of conveyor belt 16 which drops the fines fraction down through chute 31 onto conveyor belt 62.

Referring again to FIG. 2, it can be seen that the second wheeled component 6 also comprises a height-adjustable framework 86 for supporting the cross-belt magnet 24 (framework 86 has been omitted from FIG. 1 for clarity). The height-adjustable feature of framework 86 permits framework 86 to be lowered during transit and raised to a height for operation that may exceed relevant road transport height restrictions. Although framework 86 may be of any suitable design to provide the supporting and height-adjustability functions, it preferably is designed to have four telescoping legs 88, the bottom sections 90 of which are anchored onto the bed floor 54 and fit inside of the respective top portions. The bottom sections 90 of the legs 88 also preferably contain an internal set of pulleys (not shown) near their top and bottom ends so that a cable (not shown) may be provided to pass over the bottom pulley and then over the top pulley and then on to attach to the bottom end of the corresponding top sections 92 of the legs 88 so that by winching in and out the cable, the top portion of the frame 86 can be raised or lowered, respectively. During operation, the height of the framework 86 is preferably adjusted so as to position the cross-belt magnet 24 an optimal height, e.g., about 7 inches to about 10 inches, above the surface of the conveyor belt 18 so that it may optimally collect the magnet attractable scrap metals from the mid-range fraction. Pins, e.g., pin 94, are preferably used to secure the positions of the top sections 92 at the selected height.

Referring again to FIG. 1, the manual picking station 28 occupies the area of the bed floor 54 near the pulled end 58 of the second wheeled component 6. It comprises a picking table 72 that is formed by the horizontally running exit end portion of the conveyor belt 42 that is bearing the mid-range fraction away from the eddy-current separator 26. Foot mats 96, 98, are provided to provide safe traction and foot cushioning for the operators who man the manual picking station 28 to pick visually identifiable pieces of metal from the mid-range fraction. A guide 100 is provided at the end of the conveyor belt 42 to help guide the cleaned mid-range fraction exiting the conveyor belt 42 downwardly onto the conveyor belt 60 to carry it away to pile 74.

The second wheeled component 6 optionally also comprises a spray station 102 for spraying a chemical or solution onto the cleaned contaminated soil as it is carried on conveyor belt 60 for neutralizing harmful chemicals that may be contained in the contaminated soil. The spray station 102 comprises a reservoir container 104 for holding the chemical or solution that is to be applied, a pressurizing pump 106 to pressurize the chemical or solution, and a spraying wand 108 for spraying the chemical or solution onto the contaminated soil. The components of the spray station 102 may be held in place during transit by a bracket or container located either above or below the bed floor 54. If desired, spray station 102 or other spray stations may be utilized to treat the contaminated soil at any point or points along any of the conveyors or at any of the stockpiles or collection bins associated with the mobile scrap recovery apparatus 2.

One or more electrical generators may be provided to power the equipment and controls that comprise one or both of the first and second wheeled components. However, electrical power may be provided from line grid sources where it is available.

In the embodiment of the present invention depicted in FIG. 1, all of the equipment and controls comprising the embodiment are electrical driven or actuated. In other embodiments, however, other types of power drives and controls, e.g., pneumatic or hydraulic, may be employed, either in addition to or as a replacement for some or all of the electrical power or controls of the FIG. 1 illustrated embodiment. Referring to FIG. 1, a generator 76 is shown providing electrical power through the electrical line 78 to the control panel 80 on the second wheeled component 6 to controllably power the equipment of the second wheeled component 6. A second electrical line 82 is connected from control panel 80 to another control panel 84 on the first wheeled component 4 to controllably power the equipment of the first wheeled component 4.

In addition to the items described above, embodiments of the present invention may include other items, including without limitation, safety features such as guardrails, guard screens, and safety stop switches, and processing enhancements such as guides along the conveyor belts, funneling structures, supporting structures and rolls, etc.

In accordance with another aspect of the present invention, a mobile soil processing apparatus, such as the one described above, is utilized for recovering scrap metal from contaminated soil. Although these method embodiments of the present invention may utilize the contaminated soil from handling facilities, the contaminated soil may be from any source.

Embodiments of these methods make use of a mobile scrap metal recovery apparatus having a first wheeled component having a screener adapted to separate contaminated soil into at least a coarser fraction and a finer fraction; a second wheeled component having a magnetic separator, an eddy current separator, a manual picking station, and a first conveyor belt adapted to transport at least one of the coarser fraction and the finer fraction from the eddy current separator to the manual picking station; and a second conveyor belt adapted to transport at least one of the coarser fraction and the finer fraction from the first wheeled component to the second wheeled component. The first and said second wheeled components are configured to be road transportable and the magnetic separator is adapted to remove magnet attractable scrap metal from at least one of the coarser fraction and the finer fraction, preferably prior to that fraction feeding into the eddy current separator.

In one such preferred method of use, each of the first and second wheeled components 4, 6 are connected to tractor trucks and pulled over roads to a location within a handling facility that is in proximity to a first quantity of contaminated soil. The first and second wheeled components 4, 6 are positioned as shown in FIG. 1 and the tractor trucks are disconnected and moved away from them. The framework 86 is raised to the desired height and pinned secure. The various conveyor belts described above are put into position. A generator 76, which has been transported by truck, is put into position and power lines 78, 82 are connected as shown in FIG. 1. After assembly and safety testing have been completed, the various components of the mobile soil processing apparatus 2 are turned on and contaminated soil is fed into the mobile scrap metal recovery apparatus 2. This may be done by having an excavator dump bucket loads of contaminated soil into the feed bin 10 of the screener 8. The mobile soil processing apparatus 2 is then operated to remove at least some of the scrap metal from the contaminated soil. To do this in this embodiment, the conveyor belt 14 feeds the contaminated soil from the feed bin 10 into the rotating cylindrical screen 12 where it is screened as it travels toward the exit end 20 of the rotating cylindrical screen 12. The coarse fraction that is expelled from the exit end 20 is transported by conveyor belt 22 to collection bin 23. Magnet attractable scrap metal is removed from the coarse fraction by the magnet head drum 25 at the end of the conveyor belt 22.

The mid-range fraction passes through rotating cylindrical screen 12 and onto a conveyor belt 17 that transfers it to conveyor belt 18. Conveyor belt 18 is inclined upward so as to feed the mid-range fraction into the vibratory feed pan 30. As the mid-range fraction being transported by conveyor belt 18 passes under the cross-belt magnet 24, the cross-belt magnet 24 removes magnet attractable pieces of metal from it and casts the magnet attractable metal pieces into a collection box 29 by way of a chute 27. The mid-range fraction entering vibratory feed pan 30 is urged by its vibrations to spread out into a forward moving, wide, shallow sheet-like stream. This sheet-like stream enters the feed table portion 32 of the eddy current separator 26 from which it travels over the separator head 34. The separator head 34 causes non-magnet attractable scrap metal pieces to be thrown to the far side of the collection box 36 where they are funneled down by the divider 38 and the metal sheets 39, 41 onto a conveyor belt 40 for transport to a collection bin 44. The remainder of the mid-range fraction that passed over the separator head 34 falls into the near side of the collection box 36 and down onto conveyor belt 42 for transport to the manual picking station 28. Persons at the manual picking station 28 manually remove remaining scrap metal from the mid-range fraction. The cleaned mid-range fraction falls off of the exit end of conveyor belt 42 onto a conveyor belt 60 to be transported to a stockpile location where it forms a pile 74. Meanwhile, the fine fraction of the contaminated soil that was separated out by the rotating cylindrical screen 12 of first wheeled component 4 falls onto the conveyor belt 15 which transfers it to the conveyor belt 16. Conveyor belt 16, in turn, transports the fine fraction to the chute 31 which directs it onto conveyor belt 62, which runs along the length of second wheeled component 6 below the bed floor 54. Conveyor belt 62, in turn, dumps the fine fraction onto conveyor belt 60 where it joins with the cleaned mid-range fraction and is transported to pile 74. If desired, a neutralizing chemical or solution may be pumped from container 104 by pump 106 and sprayed from spraying wand 108 onto the contaminated soil that is being carried by conveyor belt 60 to treat harmful chemicals present in the contaminated soil.

After the quantity of contaminated soil has been processed, the mobile scrap metal recovery apparatus may be moved to another location either within the handling facility or elsewhere and used again in a similar fashion to remove scrap metal from another quantity of contaminated soil.

In another aspect of the present invention, there are provided methods of conducting the business of scrap metal recovery. Embodiments of this aspect of the present invention revolve around the use of a mobile scrap metal recovery apparatus for obtaining economic value through the recovery of scrap metal from contaminated soil. Although the method may utilize the contaminated soil from handling facilities, the contaminated soil may be from any source.

Embodiments of these business methods make use of a mobile scrap metal recovery apparatus having a first wheeled component having a screener adapted to separate contaminated soil into at least a coarser fraction and a finer fraction; a second wheeled component having a magnetic separator, an eddy current separator, a manual picking station, and a first conveyor belt adapted to transport at least one of the coarser fraction and the finer fraction from the eddy current separator to the manual picking station; and a second conveyor belt adapted to transport at least one of the coarser fraction and the finer fraction from the first wheeled component to the second wheeled component. The first and said second wheeled components are configured to be road transportable and the magnetic separator is adapted to remove magnet attractable scrap metal from at least one of the coarser fraction and the finer fraction, preferably prior to that fraction feeding into the eddy current separator.

A preferred embodiment of a method for conducting the business of scrap metal recovery according the present invention involves the following steps. The right to use a mobile scrap metal recovery apparatus is acquired, for example, without limitation, a mobile scrap metal recovery apparatus as described above with regard to FIGS. 1 and 2. Also, the right to remove scrap metal from a quantity of contaminated soil is obtained. The mobile scrap metal recovery apparatus is moved to a location which is a predetermined distance from the quantity of contaminated soil. The mobile scrap metal recovery apparatus is operated to remove scrap metal from the quantity of contaminated soil, for example, without limitation, in the manner described above. Economic value is obtained from the performance of the scrap metal recovery. This may be done by selling at least a portion of the recovered scrap metal. It also may be done by obtaining a processing fee from some person for removing the scrap metal from the contaminated soil.

Additionally, rights may be obtained to remove the scrap metal from another quantity of contaminated soil, and the mobile scrap recovery apparatus is moved to a location which is a predetermined distance from that quantity of contaminated soil. The mobile scrap metal recovery apparatus is operated to remove scrap metal from the contaminated soil, for example, without limitation, in the manner described above. Economic value is obtained from the performance of the scrap metal recovery.

In some embodiments, it is advantageous to provide an electrical generator to power at least one of the wheeled components of the mobile scrap metal recovery apparatus. It may also be advantageous to provide a fence around the mobile scrap metal recovery apparatus to restrict access to the mobile scrap metal recovery apparatus and/or to restrict unauthorized viewing of the amount of scrap metal recovered through its operation. It may also be advantageous to provide a crew of one or more trained persons to operate the mobile scrap metal recovery apparatus.

Some business plan embodiments of the present invention also include a step of applying one or more neutralizing chemicals or solutions to the contaminated soil to treat non-scrap metal contaminants that are present in the contaminated soil.

While only a few embodiments of the present invention have been shown and described, it will be obvious to those skilled in the art that many changes and modifications may be made thereunto without departing from the spirit and scope of the invention as described in the following claims. All United States patents and applications identified herein are incorporated herein by reference in their entireties.

What is claimed is:

1. A mobile scrap metal recovery apparatus adapted to recover scrap metal from scrap metal-contaminated soils, said apparatus comprising:
    (a) a first wheeled component having a screener adapted to separate scrap metal-contaminated soil into at least a coarser fraction and a finer fraction;
    (b) a second wheeled component having a magnetic separator, an eddy current separator, a manual picking station, and a first conveyor belt adapted to transport at least one of said coarser fraction and said finer fraction from said eddy current separator to said manual picking station; and
    (c) a second conveyor belt adapted to transport at least one of said coarser fraction and said finer fraction from said first wheeled component to said second wheeled component;
    wherein each of said first and said second wheeled components is configured to be road transportable and said magnetic separator is adapted to remove magnet attractable scrap metal from at least one of said coarser fraction and said finer fraction.

2. The apparatus of claim 1, further comprising an electrical generator having sufficient electricity-generating capacity to power at least one of said first and second wheeled components during a scrap recovery operation.

3. The apparatus of claim 1, wherein each of said first and second wheeled components is configured to be road transportable over a road that is part of the United States National Network.

4. The apparatus of claim 1, wherein said first wheeled component also has a height-adjustable support, wherein said height adjustable support is adapted to support said magnetic separator and to raise said magnetic separator to a height above ground level that is greater than the maximum permissible height for road transportation.

5. The apparatus of claim 1, wherein said first wheeled component also has a feed bin and a third conveyor belt and said screener has a screen, wherein said third conveyor belt is adapted to transport said scrap metal-contaminated soil from said feed bin to said screen.

6. The apparatus of claim 5, wherein said third conveyor belt comprises a metal belt.

7. The apparatus of claim 1, wherein said second wheeled component also has a vibratory feeder adapted to feed at least one of said coarser fraction and said finer fraction into said eddy current separator.

8. The apparatus of claim 1, wherein said second wheeled component also has at least one axle-set of wheels, a frame, and a bed floor, wherein said axle set of wheels provides support to said frame during road transport, said frame supports said bed floor, and said eddy current separator and said manual picking station are mounted on at least one of said frame and said bed floor.

9. The apparatus of claim 8, wherein said second wheeled component also has a fourth conveyor belt adapted to transport at least one of said coarser fraction and said finer fraction along a major portion of the length of said second wheeled component, wherein said fourth conveyor belt is positioned below said bed floor.

10. The apparatus of claim 8, wherein said apparatus comprises a fifth conveyor belt adapted to transport at least one of said coarser fraction and said finer fraction to said fourth conveyor belt from said first wheeled component.

11. The apparatus of claim 8, wherein said bed floor has a first aperture and said first conveyor belt passes through said first aperture.

12. The apparatus of claim 8, wherein said second wheeled component has a sixth conveyor belt and said frame has a reinforced area and a second aperture located within said reinforced area, said sixth conveyor belt being at least partially mounted on said frame, passing through said second aperture, and being adapted to receive scrap metal separated by said eddy current separator from at least one of said coarser fraction and said finer fraction.

13. The apparatus of claim 1, wherein said screener is a trommel screener.

14. The apparatus of claim 1, further comprising a means for neutralizing a chemical contaminant in the scrap metal-contaminated soil.

15. A method for removing scrap metal from scrap metal-contaminated soils, said method comprising:
    a) moving a mobile scrap metal recovery apparatus to a first location which is a predetermined distance from a first quantity of scrap metal-contaminated soil, said mobile scrap metal recovery apparatus having:
        i) a first wheeled component having a screener adapted to separate scrap metal-contaminated soil into at least a coarser fraction and a finer fraction;
        ii) a second wheeled component having a magnetic separator, an eddy current separator, a manual picking station, and a first conveyor belt adapted to transport at least one of said coarser fraction and said finer fraction from said eddy current separator to said manual picking station; and
        iii) a second conveyor belt adapted to transport at least one of said coarser fraction and said finer fraction from said first wheeled component to said second wheeled component;
        wherein each of said first and said second wheeled components is configured to be road transportable and said magnetic separator is adapted to remove magnet attractable scrap metal from at least one of said coarser fraction and said finer fraction;
    b) feeding scrap metal-contaminated soil from said first quantity into said mobile scrap metal recovery apparatus; and
    c) operating said mobile scrap metal recovery apparatus so as to remove at a least some of the scrap metal from said scrap-metal-contaminated soil.

16. The method of claim 15, further comprising the steps of:
    d) moving said mobile scrap metal recovery apparatus from said first location to a second location which is a predetermined distance from a second quantity of scrap metal-contaminated soil; and
    e) repeating steps (b) and (c) so as to remove at a least some of the scrap metal from said second quantity of scrap-metal-contaminated soil.

17. The method of claim 15, further comprising the step of configuring each of said first and second wheeled components to be road transportable over a road that is part of the United States National Network.

18. The method of claim 15, further comprising the step of providing an electrical generator to power at least one of said first and second wheeled components during the performance of step (c).

19. The method of claim 15, wherein said first wheeled component also has a feed bin and a third conveyor belt and said screener has a screen, wherein said third conveyor belt is adapted to transport said scrap metal-contaminated soil from said feed bin to said screen.

20. The method of claim 19, wherein said third conveyor belt comprises a metal belt.

21. The method of claim 15, further comprising the steps of:
    d) providing a framework to support said magnetic separator; and
    e) raising said framework to a height above ground level which is greater than the maximum permissible height permissible for road transportation.

22. The method of claim 15, wherein said second wheeled component has a vibratory feeder adapted to feed at least one of said coarser fraction and said finer fraction into said eddy current separator.

23. The method of claim 15, wherein said second wheeled component has at least one axle-set of wheels, a frame, and a bed floor, wherein said axle set of wheels provides support to said frame during road transport, said frame supports said bed floor, and said eddy current separator and said manual picking station are mounted on at least one of said frame and said bed floor.

24. The method of claim 23, wherein said second wheeled component has a fourth conveyor belt adapted to transport at least one of said coarser fraction and said finer fraction along a major portion of the length of said second wheeled component, wherein said fourth conveyor belt is positioned below said bed floor.

25. The method of claim 23, wherein said apparatus comprises a fifth conveyor belt adapted to transport at least one of said coarser fraction and said finer fraction to said fourth conveyor belt from said first wheeled component.

26. The method of claim 23, wherein said bed floor has a first aperture and said first conveyor belt passes through said first aperture.

27. The method of claim 23, wherein said second wheeled component has a sixth conveyor belt and said frame has a reinforced area and a second aperture located within said reinforced area, said sixth conveyor belt being at least partially mounted on said frame, passing through said second aperture, and being adapted to receive scrap metal separated by said eddy current separator from at least one of said coarser fraction and said finer fraction.

28. The method of claim 15, wherein said screener is a trommel screener.

29. The method of claim 15, further comprising the step of applying a neutralizing chemical or solution to the scrap metal-contaminated soil.

30. A method for conducting the business of scrap metal recovery, said method comprising the steps of:
    a) acquiring the use of a mobile scrap metal recovery apparatus having:
        i) a first wheeled component having a screener adapted to separate scrap metal-contaminated soil into at least a coarser fraction and a finer fraction;
        ii) a second wheeled component having a magnetic separator, an eddy current separator, a manual picking station, and a first conveyor belt adapted to transport at least one of said coarser fraction and said finer fraction from said eddy current separator to said manual picking station; and iii) a second conveyor belt adapted to transport at least one of said coarser fraction and said finer fraction from said first wheeled component to said second wheeled component;

wherein each of said first and said second wheeled components is configured to be road transportable and said magnetic separator is adapted to remove magnet attractable scrap metal from at least one of said coarser fraction and said finer fraction;

b) obtaining the right to remove scrap metal from a first quantity of scrap metal-contaminated soil;

c) moving said mobile scrap metal recovery apparatus to a first location which is a predetermined distance from said first quantity of scrap metal-contaminated soil;

d) operating said mobile scrap metal recovery apparatus to remove scrap metal from said first quantity of scrap metal-contaminated soil; and e) obtaining economic value from the performance of step (d).

31. The method of claim 30, wherein step (e) includes selling at least a portion of the scrap metal removed during step (d).

32. The method of claim 30, wherein step (e) includes obtaining a processing fee from another person for performing step (d).

33. The method of claim 30, further comprising the steps of:

f) obtaining the right to remove scrap metal from a second quantity of scrap metal-contaminated soil;

g) moving said mobile scrap metal recovery apparatus to a second location which is a predetermined distance from said second quantity of scrap metal-contaminated soil;

h) operating said mobile scrap metal recovery apparatus to remove scrap metal from said second quantity of scrap metal-contaminated soil; and i) obtaining economic value for the performance of step (h).

34. The method of claim 30, further comprising the step of providing a crew to perform step (d), said crew consisting of one or more persons.

35. The method of claim 30, further comprising the step of installing a fence around said mobile scrap metal recovery apparatus at said first location, wherein said fence restricts unauthorized access to said mobile scrap metal recovery apparatus.

36. The method of claim 35, wherein said fence restricts unauthorized viewing of the amount of scrap metal recovered during step (d).

37. The method of claim 30, further comprising the step of providing an electrical generator to power at least one of said first and second wheeled components during the performance of step (d).

38. The method of claim 30, wherein said first wheeled component also has a feed bin and a third conveyor belt and said screener has a screen, wherein said third conveyor belt is adapted to transport said scrap metal-contaminated soil from said feed bin to said screen.

39. The method of claim 38, wherein said third conveyor belt comprises a metal belt.

40. The method of claim 30, further comprising the steps of:

d) providing a framework to support said magnetic separator; and e) raising said framework to a height above ground level which is greater than the maximum permissible height permissible for road transportation.

41. The method of claim 30, wherein said second wheeled component has a vibratory feeder adapted to feed at least one of said coarser fraction and said finer fraction into said eddy current separator.

42. The method of claim 30, wherein said second wheeled component has at least one axle-set of wheels, a frame, and a bed floor, wherein said axle set of wheels provides support to said frame during road transport, said frame supports said bed floor, and said eddy current separator and said manual picking station are mounted on at least one of said frame and said bed floor.

43. The method of claim 42, wherein said second wheeled component has a fourth conveyor belt adapted to transport at least one of said coarser fraction and said finer fraction along a major portion of the length of said second wheeled component, wherein said fourth conveyor belt is positioned below said bed floor.

44. The method of claim 42, wherein said apparatus comprises a fifth conveyor belt adapted to transport at least one of said coarser fraction and said finer fraction to said fourth conveyor belt from said first wheeled component.

45. The method of claim 42, wherein said bed floor has a first aperture and said first conveyor belt passes through said first aperture.

46. The method of claim 42, wherein said second wheeled component has a sixth conveyor belt and said frame has a reinforced area and a second aperture located within said reinforced area, said sixth conveyor belt being at least partially mounted on said frame, passing through said second aperture, and being adapted to receive scrap metal separated by said eddy current separator from at least one of said coarser fraction and said finer fraction.

47. The method of claim 30, wherein said screener is a trommel screener.

48. The method of claim 30, further comprising the step of applying a neutralizing chemical or solution to the scrap metal-contaminated soil.

* * * * *